(12) United States Patent
Mysore

(10) Patent No.: US 9,979,483 B2
(45) Date of Patent: May 22, 2018

(54) SPATIALLY MULTIPLEXED RECEIVER FOR OBI-FREE MULTIPOINT-TO-POINT OPTICAL NETWORKS

(71) Applicant: Aurora Networks, Inc., San Jose, CA (US)

(72) Inventor: Sudhesh Mysore, Morgan Hill, CA (US)

(73) Assignee: Aurora Networks, Inc., San Jose, CA (US)

( * ) Notice: Subject to any disclaimer, the term of this patent is extended or adjusted under 35 U.S.C. 154(b) by 0 days. days.

(21) Appl. No.: 15/130,229

(22) Filed: Apr. 15, 2016

(65) Prior Publication Data

US 2016/0308616 A1   Oct. 20, 2016

Related U.S. Application Data

(60) Provisional application No. 62/149,269, filed on Apr. 17, 2015.

(51) Int. Cl.
| | | |
|---|---|---|
| *H04B 10/2575* | (2013.01) | |
| *H04B 10/67* | (2013.01) | |
| *H04B 10/50* | (2013.01) | |
| *H04B 10/66* | (2013.01) | |
| *H04J 14/08* | (2006.01) | |
| *G02B 6/42* | (2006.01) | |
| *G02B 6/06* | (2006.01) | |

(52) U.S. Cl.
CPC ....... *H04B 10/2575* (2013.01); *G02B 6/4206* (2013.01); *H04B 10/50* (2013.01); *H04B 10/66* (2013.01); *H04B 10/67* (2013.01); *H04J 14/08* (2013.01); *G02B 6/06* (2013.01)

(58) Field of Classification Search
CPC .... H04B 10/2575; H04B 10/50; H04B 10/66; H04B 10/67; G02B 6/4206; G02B 6/06; H04J 14/08
See application file for complete search history.

(56) References Cited

U.S. PATENT DOCUMENTS

| 4,730,198 | A | * | 3/1988 | Brown | ................. | G02B 6/3636 |
| | | | | | | 257/E27.133 |
| 5,138,677 | A | * | 8/1992 | O'Shaughnessy | ... | G02B 6/2808 |
| | | | | | | 250/227.11 |
| 2006/0133739 | A1 | * | 6/2006 | Kim | ....................... | G02B 6/421 |
| | | | | | | 385/88 |

(Continued)

FOREIGN PATENT DOCUMENTS

| EP | 0891570 A1 | 1/1999 |
| EP | 2775331 A2 | 9/2014 |
| WO | 93/08494 A1 | 4/1993 |

OTHER PUBLICATIONS

PCT Search Report & Written Opinion, Re: Application No. PCT/US2016/027919, dated Jul. 1, 2016.

(Continued)

*Primary Examiner* — Danny Leung
(74) *Attorney, Agent, or Firm* — Thomas A. Ward

(57) ABSTRACT

Receiving a plurality of optical signals from a plurality of optical paths using a single optical receiver having a large-area photodiode having an active area that is optically coupled to the plurality of optical paths provides significant commercial advantages such as lower cost as well as reduced size and maintenance.

7 Claims, 5 Drawing Sheets

(56) References Cited

U.S. PATENT DOCUMENTS

| | | | | | |
|---|---|---|---|---|---|
| 2007/0297801 | A1* | 12/2007 | Mostert | | H04B 10/27 398/81 |
| 2010/0142949 | A1* | 6/2010 | Mysore | | H04B 10/25751 398/48 |
| 2010/0150557 | A1* | 6/2010 | Mysore | | H04J 14/0226 398/68 |
| 2010/0220994 | A1* | 9/2010 | Pradzynski | | H04J 14/0282 398/1 |
| 2010/0221019 | A1* | 9/2010 | Wolodkowicz | | H04B 10/69 398/202 |
| 2012/0308237 | A1* | 12/2012 | Mutalik | | H04B 10/25751 398/116 |
| 2013/0160068 | A1* | 6/2013 | Pradzynski | | H04B 10/25751 725/121 |
| 2013/0279855 | A1* | 10/2013 | Choi | | G02B 6/4246 385/42 |
| 2014/0276056 | A1* | 9/2014 | Ohta | | A61B 6/465 600/440 |
| 2015/0078759 | A1* | 3/2015 | Mysore | | H04B 10/503 398/136 |
| 2015/0280290 | A1* | 10/2015 | Saha | | H01M 10/48 429/50 |
| 2016/0013881 | A1* | 1/2016 | Rejaly | | H04J 14/0224 398/69 |
| 2016/0241337 | A1* | 8/2016 | Mysore | | H04B 10/0795 |
| 2016/0308616 | A1* | 10/2016 | Mysore | | H04B 10/2575 |
| 2016/0308664 | A1* | 10/2016 | Ishaug | | H04B 10/5161 |
| 2017/0331556 | A1* | 11/2017 | Mutalik | | H04B 10/64 |

OTHER PUBLICATIONS

N. Cheng, et al., "Large splitting and long reach passive optical networks with mode coupling receivers, 36th European Conference and Exhibition on Optical Communication", Sep. 19, 2010, pp. 1-3.

* cited by examiner

SPATIALLY MULTIPLEXED RECEIVER FOR OBI-FREE MULTIPOINT-TO-POINT OPTICAL NETWORKS

CROSS-REFERENCE TO RELATED APPLICATION

Referring to the application data sheet filed herewith, this application claims a benefit of priority under 35 U.S.C. 119(e) from provisional patent application U.S. Ser. No. 62/149,269, filed Apr. 17, 2015, the entire contents of which are hereby expressly incorporated herein by reference for all purposes.

BACKGROUND

Field of Endeavor

Embodiments of this disclosure relate generally to the field of passive optical networks where the return path is a multipoint-to-point optical path where multiple optical signals are detected by a single optical receiver. This disclosure relates to transport of CATV (cable television) and digital signals over optical components, both passive (optical filters, optical fiber, etc.) and active that are detected by a single optical receiver.

Discussion of Related Art

A large number of optical paths are combined and then connected to a single receiver in the return path of a multipoint-to-point optical network. If two or more optical signals are simultaneously present in the return path of such networks, and their optical wavelengths happen to cross each other (resulting in an optical wavelength collision), then optical heterodyning between the signals involved in the optical collisions results in a very large increase in the noise floor, a phenomenon referred to as Optical Beat Interference (OBI).

OBI is avoided in typical Passive Optical Networks (PONs) since they usually operate in a Time Division Multiplexing Access (TDMA) scheme whereby only one return path optical source is allowed to be on at any given time. However, there are some multipoint-to-point systems, such as Radio Frequency Over Glass (RFoG) systems in CATV networks, where it is possible that multiple return path optical sources are simultaneously on. This happens, for example, if there are multiple services operating (such as telephone, high-speed data, etc), each of which allows one optical source to be on. A second way that multiple optical sources could be on simultaneously in the return path is that DOCSIS (data over cable service interface specifications) systems in CATV networks allow multiple return path transmitters to be operating simultaneously, in different frequency bands. This means that OBI could occur in such networks, with a resulting possibility of service interruptions.

One method that manufacturers have used to avoid OBI in susceptible networks is to use active or passive techniques to avoid the possibility of two return path wavelengths being too close to each other. One passive method of avoiding OBI is to sort the optical transmitters into different "wavelength bins" that are wide enough so that transmitters in different bins do not beat with each other over typical operating conditions—but this means using many different transmitter sort sub-sets (each with a corresponding part number) and expending much effort in sorting transmitters. This would reduce effective transmitter yield in context because some transmitters would not fit into any of the wavelength bins. The maximum number of splits in such a system would also be limited by the number of wavelength bins available. Supporting PON systems with 64 or 256 splits would be difficult in such a passive OBI avoidance technique.

An active method of avoiding OBI is to actively tune the transmitter wavelength (through relatively low-cost methods such as temperature tuning) in order to avoid OBI. This necessarily entails higher cost, as more robust TECs (thermoelectric coolers) must be employed for temperature (and hence wavelength) control. A managed system could also be used whereby communications with the optical transmitter allows the operator to actively change the transmitter wavelength.

Disadvantages of both active and passive techniques of controlling transmitter wavelengths are that costs are higher, and also, the operator must only use that particular brand of transmitter. The operators are not able to add other wavelengths from other vendors, since then OBI might occur. Also, some customers might desire an OBI avoidance technique that works for any set of return path wavelengths, even if some of them are identical. One trivial method of doing this is to use one receiver for each return path transmitter, then combine the signals in the electrical domain, then re-modulate another transmitter with the combined RF (radio frequency) signal. This OBI-avoidance technique, however, would be too expensive (especially for large number of split such as 64, 128 or 256-way splits) and would be unable to compete with other solutions that did not entail the use of a large number of receivers.

SUMMARY

There is a need for the following embodiments of the present disclosure. Of course, the present disclosure is not limited to these embodiments.

According to an embodiment of the present disclosure, a method comprises: receiving a plurality of optical signals from a plurality of optical paths using a single optical receiver having a large-area photodiode having an active area that is optically coupled to the plurality of optical paths. According to another embodiment of the present disclosure, an apparatus comprises: a plurality of optical paths; and a single optical receiver including a large-area photodiode coupled to the plurality of optical paths, the single large-area photodiode including an active area that is optically coupled to the plurality of optical paths.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings. The described embodiments may be better understood by reference to one or more of these drawings in combination with the following description presented herein. It should be noted that the features illustrated in the drawings are not necessarily drawn to scale.

DETAILED DESCRIPTION

Figure 1:
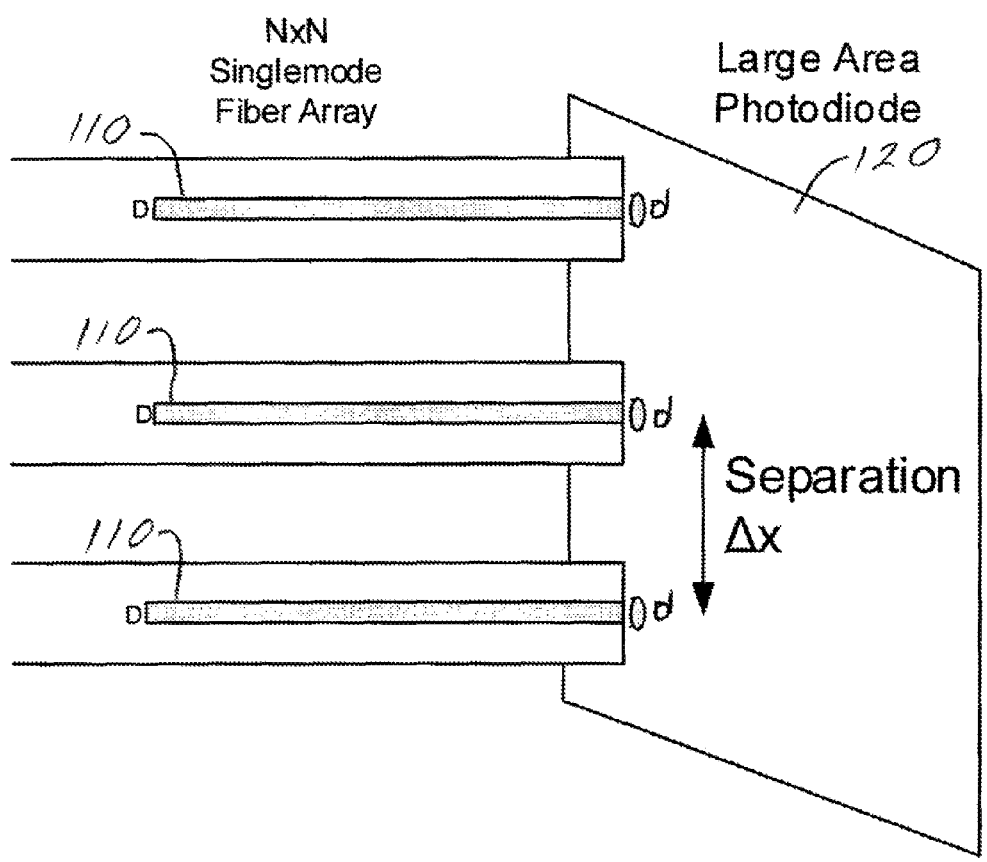
FIG. 1 illustrates optical fibers butt-coupled against a large-area photodiode.

Embodiments presented in the present disclosure and the various features and advantageous details thereof are explained more fully with reference to the nonlimiting embodiments that are illustrated in the accompanying drawings and detailed in the following description. Descriptions of well known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

This disclosure describes a method whereby OBI is avoided, using a single return path receiver, even if many of the return path transmitters are operating at the same wavelength. A key point in this disclosure is the use of a large-area photodiode and the avoidance of OBI by spatially separating the images of the return signal mode fields on the photodiode. By employing such a spatial multiplexing technique, and minimizing the overlap of the mode fields, this disclosure shows that OBI suppression of greater than 100 dB can be obtained.

Objections that might be raised against the use of this spatial multiplexing OBI-avoidance technique are that (1) photodiodes that have large enough area may have too small a bandwidth, and (2) the degree of precision necessary in coupling the multiple fibers to the single photodiode would make this device too expensive. This disclosure shows that both of these concerns are unwarranted.

Embodiments of this disclosure can be based on time domain multiple access (TDMA) return path transmitters or frequency domain multiple access (FDMA) return path transmitters. A single large-area photodiode will work with either approach because the output of the large-area photodiode is an RF (radio frequency) output. For instance, two frequency domain separated return path transmitters that overlap with regard to time will cause the large-area photodiode to generate a bimodal RF output with two peaks corresponding to the two frequencies. An important commercial advantage of embodiments of this disclosure is that a single return path receiver can be coupled to a plurality of transmitters providing significant cost savings as well as reduced size and maintenance advantages. A PON DOCSIS (data over cable service interface specifications) system can ensure that the signals are either time domain separated or frequency domain separated.

An embodiment of this disclosure can include a combiner in a multipoint-to-point system that virtually eliminates OBI degradation by butt-coupling an array of fibers to a large-area photodiode, thereby spatially separating the fibers. The coupling could be an alignment guide such as a V-groove, a tube to constrain the fibers, a hollow honeycomb, ribbon cables, or any other approach to physically separate the fibers in a stable manner.

Another embodiment of this disclosure can include a combiner in a multipoint-to-point system that virtually eliminates OBI degradation by focusing an array of fibers to a large-area photodiode using a form of a focusing lens, thereby spatially separating the image of the fibers on the large-area photodiode. For instance, the form of the focusing lens can be a multi-element lens such as a Fresnel lens.

Butt-Coupling of Fibers to Large-Area Photodiode

The first embodiment of this disclosure to be described is a simple "butt-coupling" technique, in which fibers are pushed up directly ("butt-coupled") against the photodiode. A simple component such as a V-groove, or a tube to constrain the multiple input fibers together can serve to couple the multiple input fibers to the large-area photodiode. Alignment of the axes of the ends of the fibers with a detecting surface of the photodiode is preferably controlled to be within 1.0, 0.1, 0.01 or less degrees relative to one another.

FIG. 1 shows a plurality of optical fibers 110 butt-coupled to a large-area photodiode 120. The separation between the fibers is denoted by Δx, the mode field diameter (the 1/e width of the electric field profile) of the fibers is indicated by d, and D denotes the fiber diameter.

Figure 2:
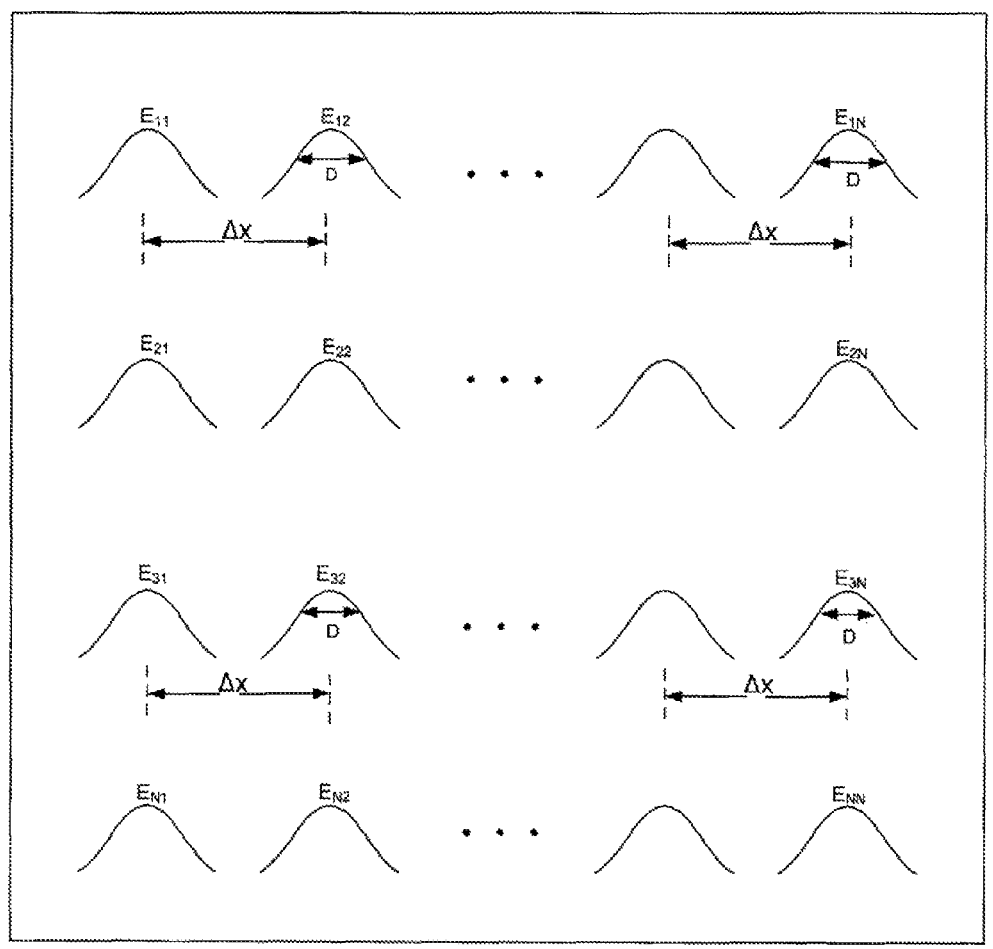
FIG. 2 illustrates Gaussian electric field profiles of an array of fibers that are butt-coupled to a large-area photodiode.

FIG. 2 shows the Gaussian electric field profiles of an array of fibers that are butt-coupled to a large-area photodiode. Again, separation between the fibers is denoted by Δx and D denotes the fiber diameter. A rectangular array of fibers is shown for illustrative purposes only. The actual configuration of the fibers could be circular, triangular, hexagonal or even a random configuration. A configuration that facilitates increasing the number of fibers per unit area of available detector surface is hexagonal. Thus, a hollow honeycomb can be an advantageous alignment device for holding the distal ends of a plurality of fibers at or near the photodiode and/or lens.

OBI Suppression Resulting from Spatial Multiplexing

Suppose we make the worst-case assumption that all four neighbors of a fiber (located a distance Δx away) happen to be at the same wavelength as the central fiber and are co-polarized, resulting in OBI noise in the central fiber. The equivalent carrier-to-noise (CNR) ratio in the central fiber due to OBI noise caused by beating with its four neighbors can be shown to be given by:

$$\text{CNR}_{OBI} = -10 \log(4Z) = -6 \text{ dB} - 10 \log(Z) \tag{1}$$

where Z is the overlap between the power in two adjacent mode fields. Since RF power is proportional to the square of the photodiode current I, and I is proportional to the square of the electric field E, and E has a Gaussian shape with mode-field diameter d, we find that the OBI-induced CNR is given by:

$$CNR_{OBI} = -6 \text{ dB} - 10 \log(Z) \tag{2}$$

-continued $$= -6 \text{ dB} - 40 \log[\exp(\Delta x/2d)^2]$$
$$= -6 \text{ dB} + 40 \log(e)(\Delta x/2d)^2$$
$$= -6 \text{ dB} + 17.37(\Delta x/2d)^2 \text{ dB}$$

The worst-case OBI-induced CNR occurs when the fibers are closest together. The minimum value of $\Delta x$ is the fiber diameter D, so that we find that the worst-case OBI-induced CNR is:

$$CNR_{OBI} = -6 \text{ dB} + 40 \log(e)(\Delta x/2d)^2 = -6 \text{ dB} + 17.37(D/2d)^2 \text{ dB} \quad (3)$$

For conventional optical fiber, we have D=125 μm, and d is approximately 10 μm, so that we find that $CNR_{OBI}$ is well over 100 dB. That is, spatially separating fibers by the width of an optical fiber is sufficient to virtually eliminate OBI noise.

Coupling a Fiber Array to a Large-Area Photodiode Using a Lens

Figure 3:
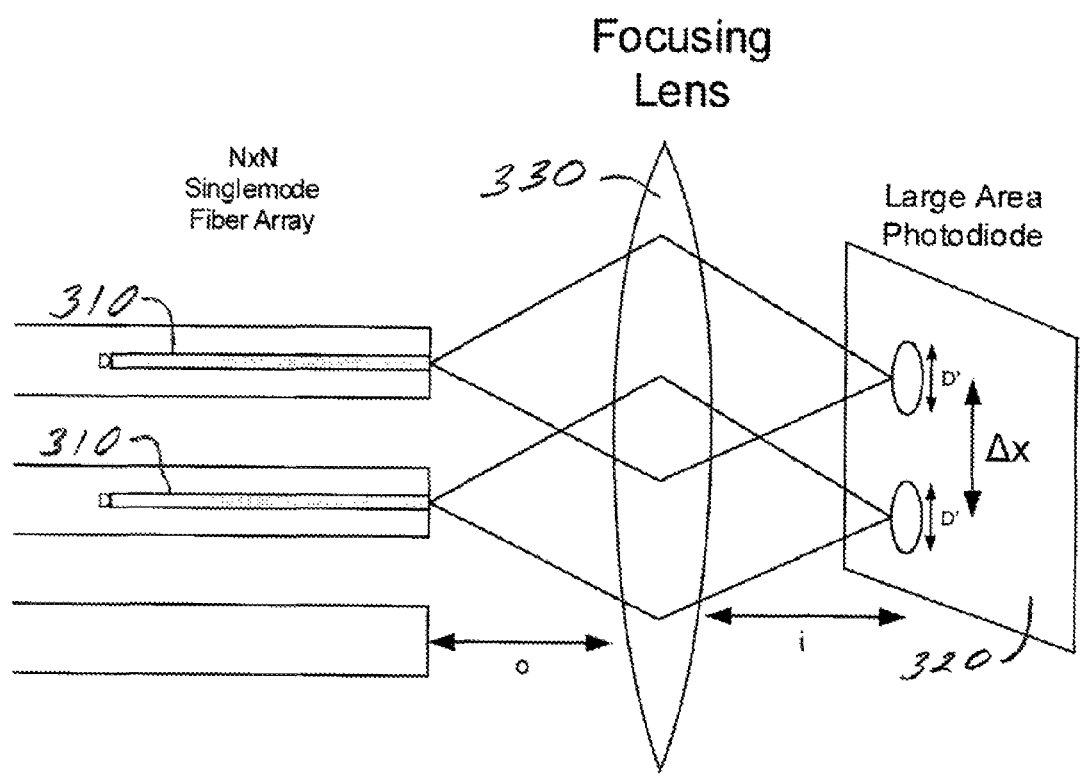
FIG. 3 illustrates coupling a fiber array to a large-area photodiode using a focusing lens with magnification |M|=i/o.

Referring to FIG. 3, OBI can also be avoided by coupling an array of fibers 310 to a large-area photodiode 320 by using a focusing lens 330. Note that, when using a focusing lens, care can be taken that the total optical intensity of the light impinging on the receiver is not so high that the receiver is driven into a nonlinear regime, or even damaged.

Figure 4:
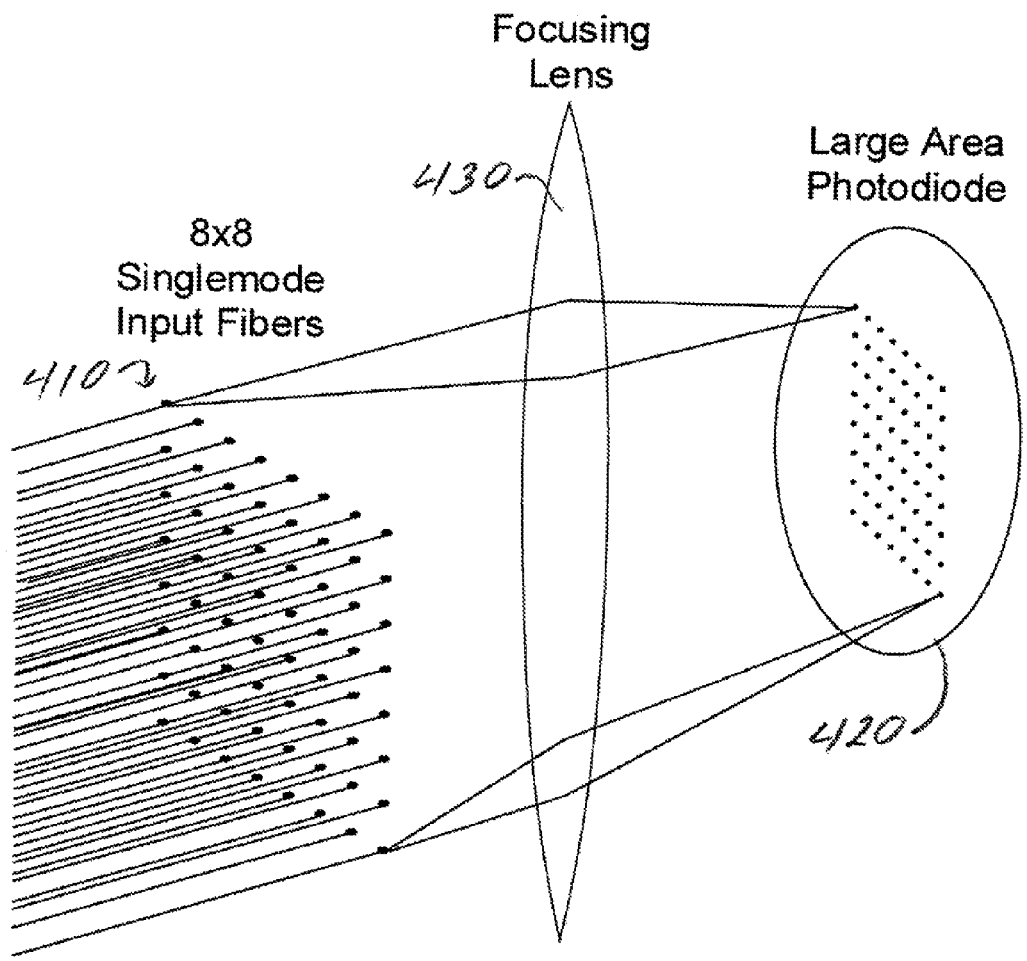
FIG. 4 illustrates coupling a large fiber array to a photodiode using a focusing lens with magnification |M|<1.

Referring to FIG. 4, in practice, this system would be used with a magnification M<1 in order that a larger array of fibers 410 could be coupled to the photodiode 420 by a lens 430. Although only an 8×8 array is shown in FIG. 4, arrays as large as 16×16 can be coupled to a large-area photodiode using a focusing lens. The degree of OBI suppression that can be obtained using a focusing lens is theoretically the same as with butt-coupling. To see this, note that both the denominator D (in equation 3) and the denominator d are multiplied by the magnification M when using a lens so that $CNR_{OBI}$ remains unchanged (well over 100 dB of OBI suppression).

In reality, low-cost focusing systems can have poor accuracy, on the order of ±5 μm. However, the degree of OBI suppression that is obtained is still excellent. For example, suppose that the magnification is M=1, so that the images of the fibers are nominally separated by $\Delta x$=125 um. However, suppose that the focusing system has a very poor precision of ±50 μm, so that $\Delta x$ actually varies from 75 μm to 175 μm. The worst-case OBI suppression happens for the case of $\Delta x$=75 μm, for which (from equation 3) we find that the OBI-induced CNR is given by:

$$CNR_{OBI} = -6 \text{ dB} + 17.37(75 \text{ um}/20 \text{ um})^2 \text{ dB} > 100 \text{ dB}$$

Even a separation of only 50 um $$CNR_{OBI} = -6 + 17.37(50/20)^2 \text{ dB} = 102.5 \text{ dB}$$

That is, even the use of a low-cost focusing lens to couple a fiber array to a large-area photodiode results in OBI suppression well over 100 dB, meaning that OBI has effectively been eliminated.

Bandwidth of Large-Area Photodiodes

The other concern with the use of large-area photodiodes to avoid OBI noise is the relatively low bandwidth (due to their larger capacitance) of such photodiodes. However, there are low-cost, readily commercially available large-area photodiodes with a diameter of 0.3 mm and a 3 dB bandwidth of 500 MHz. There are also commercially available very large 1.5 mm diameter photodiodes with a bandwidth of 300 MHz. This is more than sufficient for the return path of an RFoG system or other hybrid fiber cable (HFC) system.

Figure 5:
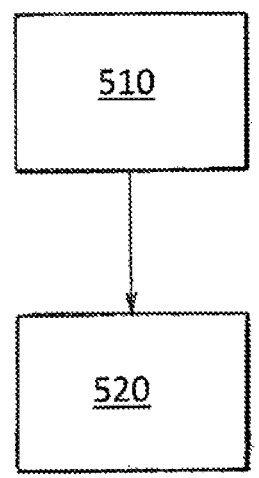
FIG. 5 is a flow diagram of a process that can be implemented by a computer program.

FIG. 5 illustrates a flow diagram of a process that can be implemented by a computer program. The process can include a first step 510 of transmitting a plurality of optical signals using a passive optical network data over cable service interface specifications system before receiving. The process can include a second step 520 of receiving the plurality of optical signals from a plurality of optical paths using a single optical receiver having a large-area photodiode having an active area that is optically coupled to the plurality of optical paths.

Definitions

The term large-area photodiode is intended to mean a photodiode having an active detecting surface area corresponding to a diameter of approximately greater than or equal to 0.15, 0.3, 1.5 or more mm. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term downstream is intended to mean the direction from a headend to customer premises equipment (CPE). The term upstream is intended to mean the direction from customer premises equipment to a headend.

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising:
   receiving a plurality of optical signals from a plurality of optical paths using a single optical receiver having a photodiode having an active area;
   providing a plurality of optical fibers to form the plurality of optical paths; and
   optically coupling the plurality of optical fibers to the active area of the photodiode using an alignment guide,
   wherein the plurality of optical signals are combined into the photodiode so that their electrical field profiles are separated by an amount optical $\Delta x$ so that electric fields of the plurality of optical signals are non-overlapping, thereby substantially eliminating Optical Beat Interference (OBI).

2. The method of claim 1, further comprising transmitting the plurality of optical signals using a plurality of frequency division multiple access optical sources coupled to the plurality of optical paths.

3. The method of claim 1, further comprising transmitting the plurality of optical signals using a plurality of time division multiple access optical sources coupled to the plurality of optical paths.

4. The method of claim 1, wherein the alignment guide comprises at least one of:
   a V-groove, a tube to constrain the plurality of optical fibers, a hollow honeycomb, and ribbon cables.

5. The method of claim 1, wherein using a single optical receiver having a large-area photodiode having an active area is further optically coupled to the plurality of optical paths using a lens.

6. The method of claim 1, further comprising transmitting the plurality of optical signals using a passive optical network data over cable service interface specifications system before receiving.

7. The method of claim 1, wherein the amount $\Delta x$ has a minimum value D of a diameter of the optical fibers.

* * * * *